United States Patent
Hibino et al.

(10) Patent No.: US 7,550,287 B2
(45) Date of Patent: Jun. 23, 2009

(54) CELL CULTURE SYSTEM APPARATUS FOR CHECKING CULTURED CELLS AND APPARATUS FOR CULTURING CELLS

(75) Inventors: Hiroki Hibino, Tokyo (JP); Shin Katayama, Tokyo (JP); Hiroyuki Irie, Tokyo (JP); Hikaru Inoue, Tokyo (JP); Hitoshi Mizuno, Tokyo (JP); Yasuharu Hakamatsuka, Tokyo (JP); Yoshiharu Saito, Tokyo (JP); Hideki Koyanagi, Tokyo (JP)

(73) Assignee: Olympus Corporation, Tokyo (JP)

( * ) Notice: Subject to any disclaimer, the term of this patent is extended or adjusted under 35 U.S.C. 154(b) by 551 days.

(21) Appl. No.: 10/509,447

(22) PCT Filed: Apr. 9, 2003

(86) PCT No.: PCT/JP03/04516

§ 371 (c)(1),
(2), (4) Date: Sep. 28, 2004

(87) PCT Pub. No.: WO03/085079

PCT Pub. Date: Oct. 16, 2003

(65) Prior Publication Data

US 2005/0158846 A1 Jul. 21, 2005

(30) Foreign Application Priority Data

Apr. 9, 2002 (JP) ............................. 2002-106677
Sep. 27, 2002 (JP) ............................. 2002-283992

(51) Int. Cl.
*C12M 3/00* (2006.01)
*C12M 1/36* (2006.01)
*C12M 1/38* (2006.01)

(52) U.S. Cl. ................................ 435/286.2; 435/287.1

(58) Field of Classification Search .............. 435/286.2, 435/287.1
See application file for complete search history.

(56) References Cited

U.S. PATENT DOCUMENTS 6,329,195 B1 * 12/2001 Pfaller ...................... 435/297.2
2003/0040104 A1 * 2/2003 Barbera-Guillem ...... 435/286.2

FOREIGN PATENT DOCUMENTS

| CA | 2303243 A1 * | 3/1999 |
| JP | S58-155087 | 9/1983 |
| JP | 9-160955 | 6/1997 |
| JP | H11-50722 | 6/1999 |
| WO | WO97/19754 * | 6/1997 |
| WO | WO 97/19754 | 6/1997 |
| WO | WO 99/12475 | 3/1999 |

OTHER PUBLICATIONS

Meidai Seikei Geka Kyoshitsu, Se o Nobasu Saiseijutsu o Kalhatsu=Tokai, Morning edition of Chubu local edition of the Yomiuri Shinibun, Jan. 16, 2002, p. 23.
Dai 7 Kai Olympus Seminar, Rinsho Kensabu ga Susumu beki Hoko ya Yuketsu Kensa no 24 Jikan Taisei eno Taio o Hokoku: Medical & Test Journal, Oct. 21, 2001, p. 5.
Takafumi Yoshikawa, "Dermis Culture and Bone Culture Using Bone Marrow Mesenchymal Cells", Bio Industry, 2001, vol. 18, No. 7, pp. 46-53 together with a partial English translation.

* cited by examiner

*Primary Examiner*—Walter D Griffin
*Assistant Examiner*—Lydia Edwards
(74) *Attorney, Agent, or Firm*—Scully, Scott, Murphy & Presser, P.C.

(57) ABSTRACT

The present invention discloses a cell culturing system that cultures predetermined cells collected from a patient and supplies cultured cells to the original patient, which together with enabling correlations between the cultured cells and the supplier of the cells to be managed accurately and easily at all times, allows cultured cells and patients to be collated rapidly.

2 Claims, 12 Drawing Sheets

FIG. 8A
1569
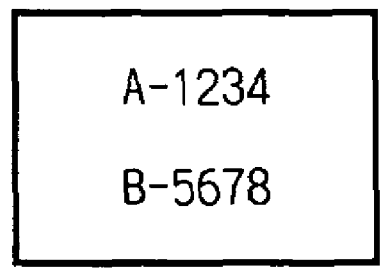
FIG. 8B
1569
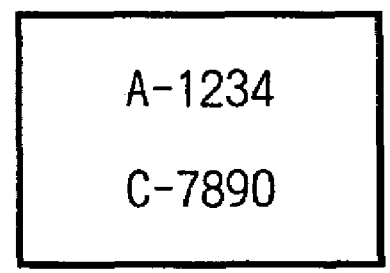
FIG. 8C
1569
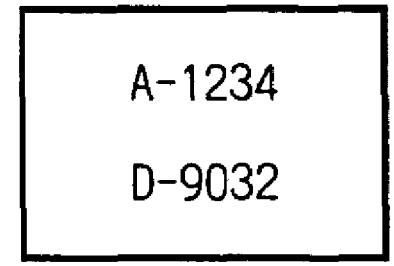

FIG. 9A
| SEARCH LIST ||
| ID NUMBER OF MOST RECENT CONTAINER | ADDRESS INFORMATION |
| --- | --- |
| ⋮ | ⋮ |
| B-5676 | #1567 |
| B-5677 | #1597 |
| B-5678 | #1569 |
| B-5679 | #1581 |
| B-5680 | #1555 |
| ⋮ | ⋮ |
FIG. 9B
| SEARCH LIST ||
| ID NUMBER OF MOST RECENT CONTAINER | ADDRESS INFORMATION |
| --- | --- |
| ⋮ | ⋮ |
| C-7888 | #1789 |
| C-7889 | #1394 |
| C-7890 | #1569 |
| C-7891 | #1659 |
| C-7892 | #1555 |
| ⋮ | ⋮ |
FIG. 9C
| SEARCH LIST ||
| ID NUMBER OF MOST RECENT CONTAINER | ADDRESS INFORMATION |
| --- | --- |
| ⋮ | ⋮ |
| D-9030 | #1789 |
| D-9031 | #1345 |
| D-9032 | #1569 |
| D-9033 | #1678 |
| D-9034 | #1554 |
| ⋮ | ⋮ |

CELL CULTURE SYSTEM APPARATUS FOR CHECKING CULTURED CELLS AND APPARATUS FOR CULTURING CELLS

TECHNICAL FIELD

The present invention relates to a cell culturing system that cultures predetermined cells collected from a patient and supplies cultured cells to the original patient.

BACKGROUND ART

Bone is currently repaired by filling a bone filler into an area of missing bone resulting from removal of a bone tumor or trauma. However, in cases in which the bone gradually becomes brittle as in osteoporosis or in cases in which the area of missing bone covers an extremely large area, it is difficult to resolve the problem by using a method like that described above.

Therefore, there has been a demand in recent years for a new approach in which bone marrow is collected from a patient, and after artificially growing fibroblasts to an adequate level from mesenchymal stem cells contained in the collected bone marrow, the fibroblasts are again returned to the patient's body. In this case, since fibroblasts are grown from bone marrow collected from the patient himself and then returned to the same patient's body, bone formation can be activated without causing an immune response (refer, for example, to the document indicated below).

Yoshikawa, "Cultured Bone and Cultured Dermis from Bone Marrow Mesenchymal Cells—Regenerative Treatment by Bone Marrow Mesenchymal Cells", Bio-industry, CMC Publishing, 2001, Vol. 18, No. 7, p. 46-53.

However, in the case of attempting to realize the above approach, it is necessary to go through numerous culturing steps and numerous inspections until the fibroblasts are adequately grown. In addition, since the same container cannot be used throughout the process, a special container is used for each step. Thus, in the case of transferring to the next step, the cultured cells must be transferred to a container suitable for the next step.

On the other hand, although obvious, it is necessary that the cultured fibroblasts be returned to the patient who supplied the original bone marrow used to form the fibroblasts.

Thus, it is essential to carefully monitor the process so as to be able to determine which cultured cells belong to which patient even if the cultured cells are transferred to a different container accompanying the transitions between steps.

In consideration of these circumstances, the object of the present invention is to provide a cell culturing system and cultured cell collating device which together with being able to accurately and easily monitor the correlation between cultured cells and the supplier of those cells, are capable of rapidly collating cultured cells and patients in a cell culturing system that cultures predetermined cells collected from a patient and supplies the cultured cells to the original patient.

DISCLOSURE OF THE INVENTION

In order to achieve the aforementioned object, the present invention provides a cell culturing system that carries in collected cells and contains them in an incoming transport container to which is attached unique identification information, transfers the transported cells to and cultures them in an intermediate container to which is attached unique identification information, and carries out the cultured cells by transferring them to an outgoing transport container to which is attached unique identification information; said system comprising an input unit that inputs identification information attached to the containers before and after transfer whenever cells are transferred to a different container, and a memory unit that stores in memory identification information input from the input unit in mutual correlation.

According to this invention, the identification information of all containers used in a series of work steps from the receiving of cells containing stem cells collected from patients to the carrying out of cells cultured from those cells can be stored in memory in mutual correlation.

As a result, by following the correlation based on identification information of the outgoing transport container in which the finished product in the form of the cultured cells are contained, it can be determined as to from which cells contained in which container the cultured cells were cultured.

In addition, the invention provides cell culturing system, wherein in the case any of the identification information input from the input unit is already stored in memory, the memory unit stores other recently input identification information by adding to the existing identification information.

According to another aspect of the invention, a log of the containers used for culturing can be stored in the memory unit.

In addition, the invention provides a cell culturing system, further comprising a rewriting unit is additionally provided that rewrites the previously stored identification information to other recently input identification information in the case any of the identification information input from the input unit is already stored in the memory unit.

According to this invention, identification information of the incoming transport container initially written into memory is continued to be stored in the memory unit without being updated, and identification information of the intermediate container correlated with this identification information of the incoming transport container is updated whenever cells are transferred.

As a result, identification information of the outgoing transport container containing the final product in the form of cultured cells, and the incoming transport container in which cells are contained that serve as the origin of the cultured cells, can be stored in memory in direct correlation.

In addition, the invention provides a cell culturing system, wherein the identification information includes information relating to the steps in which each container is used.

According to this invention, since information relating to the steps in which a container is used is included in identification information attached to each container, when storing identification information in the storage unit, it is possible to search for whether or not that identification information is already stored in memory by using information relating to a step as a key. As a result, rewriting of information to the memory unit can be carried out rapidly.

In addition, the invention provides a cell culturing system, wherein information on the hospital that is the origin of the incoming transport container is added to the incoming transport container.

According to this invention, since information on the hospital that is the origin of the incoming transport container is also correlated with identification information of the incoming transport container and stored in the memory unit, a search of the hospital where the cultured cells are to be sent can be made easily when returning cultured cells.

In addition, the invention provides a cell culturing system according to claim 1, further comprising a collating unit that collates cultured cells according to whether or not their correlation agrees with a correlation stored in the memory unit in the case the outgoing transport container identification information and the incoming transport container identification information are input as judgment information for collating cultured cells.

According to this invention, a judgment as to whether cultured cells returned from the cell culturing system were cultured from cells of the patient himself can be made both accurately and rapidly simply by judging whether or not two sets of, identification information received as judgment information for collating cultured cells are stored in mutual correlation.

In addition, the invention provides a cell culturing system, further comprising in the case identification information of the outgoing transport container has been input as judgment information for collating cultured cells, a reading unit that reads identification information correlated with identification information of the outgoing transport container from the memory unit, and an output unit that outputs the read identification information.

According to this invention, since identification information stored by correlating with identification information of the outgoing transport container received as judgment information for collating cultured cells is output (transmitted), at the hospital to which the cultured cells have been sent, collation between the patient and cultured cells can be judged both accurately and rapidly by confirming whether or not identification information of the incoming transport container containing cells that include stem cells collected from a patient to be applied to the cultured cells is contained in the output identification information.

In addition, the invention provides a cultured cell collating device for collating incoming cultured cells with patients for use in a cell culturing system provided with a memory unit, which together with carrying in collected cells by containing them in an incoming transport container to which is attached unique identification information, culturing the incoming cells by transferring to an intermediate container to which is attached unique identification information, and carrying out the cultured cells by transferring them to an outgoing transport container to which is attached unique identification information, correlates and stores in memory the identification information attached to the containers before and after transfer whenever the cells are transferred to a different container; further comprising an input unit that inputs incoming transport container identification information and outgoing transport container identification information as targets for collation, a judgment unit that judges whether the correlation of identification information input from the input unit agrees with correlation information stored in the memory unit, and an output unit that outputs the judgment result.

According to this invention, a judgment as to whether or not cultured cells returned from the cell culturing system were cultured from cells of the patient himself can be made both accurately and rapidly simply by judging whether or not two sets of identification information received as judgment information for collating cultured cells are stored in mutual correlation.

In addition, the invention provides a cultured cell collating device for collating incoming cultured cells with patients for use in a cell culturing system provided with a memory unit, which together with carrying in collected cells by containing them in an incoming transport container to which is attached unique identification information, culturing the incoming cells by transferring to an intermediate container to which is attached unique identification information, and carrying out the cultured cells by transferring them to an outgoing transport container to which is attached unique identification information, correlates and stores in memory the identification information attached to the containers before and after transfer whenever the cells are transferred to a different container; further comprising an input unit that inputs identification information of the incoming transport container or outgoing transport container as judgment information for collating cultured cells, a reading device that reads identification information from the memory unit that is correlated with the identification information input from the input unit, and an output unit that outputs the read identification information.

According to this invention, if identification information of the outgoing transport container received from the cell culturing system as judgment information for collating cultured cells is input, identification information stored in memory in correlation with the identification information of this outgoing transport container is displayed on a display and so forth.

Thus, since incoming transport container identification information correlated with patient information is contained in the displayed identification information, cultured cells received from the cell culturing system and patients can be collated both accurately and rapidly by collating this incoming transport container identification information.

The invention also provides a cell culturing device that cultures cells by transferring the cells to culture containers to which are attached unique identification information according to the cell culturing process; comprising an input unit that inputs identification information attached to culture containers before and after transfer whenever cells are transferred to a different culture container, and a memory unit that stores identification information input from the input unit in mutual correlation.

According to this invention, identification information of all culture containers used in a series of culturing steps from carrying in cells to the device to carrying out cells are stored in memory in mutual correlation even if the cells are transferred to various culture containers according to the culturing process.

As a result, by following the correlation based on identification information of the final culture container in which the finished product in the form of the cultured cells are contained, it can be determined as to from which cells cultured in which culture container the cultured cells were cultured.

The invention further provides a cell culturing device further comprising a large number of culturing chambers to which are attached unique identification information; wherein the input unit inputs identification information attached to a culture container and culturing chamber each time a culture container enters and leaves a culturing chamber, and the memory unit stores the identification information input from the input unit in mutual correlation.

According to this invention, when a culture container enters a culturing chamber, by correlating the identification information of the culture container with identification information of the culturing chamber in which the culture container is contained, the culturing step performed on cells within that culture container can be confirmed. In addition, when taking out a culture container from a culturing chamber, by correlating the identification information of the culture container with the identification information of the culturing chamber, the culturing step performed on the cells within the culture container can be confirmed.

The invention also provides a cell culturing device, further comprising a sensor, in each culturing chamber, that detects internal culturing chamber information such as temperature and humidity within that culturing chamber; wherein the memory unit stores culturing chamber identification information and internal culturing chamber information in mutual correlation at predetermined times.

According to this invention, since internal culturing chamber information detected by a sensor is stored in the memory unit by mutually correlating with culturing chamber identification information, when a culture container leaves or enters a culturing chamber, for example, or as a result of automatically storing internal culturing chamber information at predetermined time intervals according to a timer and the like, internal culturing chamber information can be retained in the form of a log of culturing conditions for the cells.

The invention provides a cell culturing device, further comprising a medium replacement unit that replaces medium that has accumulated in a culture container; wherein the storage unit stores culture container identification information and medium replacement information such as the date of medium replacement performed for that culture container, replaced medium, amount of growth factor and type of growth factor in mutual correlation.

According to this invention, by storing that medium replacement information in memory in correlation with culture container identification information whenever medium in the culture container is replaced by the operation of the medium replacement unit, medium replacement information can be retained in the form of a log of culturing conditions for the cells.

The invention also provides a cell culturing device, further comprising a medium information detection unit that detects medium information such as dissolved oxygen concentration and sugar content of medium supplied to a culture container; wherein the memory unit stores the culture container identification information and medium information in mutual correlation.

According to this invention, since medium information is detected by a medium information detection unit, by storing this in mutual correlation with culture container identification information, medium information can be retained as a log of culturing conditions for the cells.

The invention provides a cell culturing device, further comprising a cell count detection unit that detects the number of cells within a culture container; wherein the memory unit stores culture container identification information in mutual correlation with the number of cells.

According to this invention, since the number of cells within a culture container is detected by the operation of a cell count detection unit, by storing this in mutual correlation with culture container identification information, the growth status of the cells can be retained in the form of a log.

The invention provides a cell culturing device, further comprising an infection testing unit that performs infection testing on cells in a culture container; wherein the memory unit stores culture container identification information in correlation with the results of infection testing.

According to this invention, by storing the results of infection testing performed on cells by the operation of the infection testing unit in correlation with culture container identification information, the results of infection testing such as the presence of infection in cultured cells shipped as the finished product or the time at which infection was detected can be retained in the form of a log.

The invention provides a cell culturing device, wherein the memory unit stores the identification information of a culture container that contains a first specimen and the identification information of a culture container that contains another specimen cultured simultaneously to that first specimen in mutual correlation.

According to this invention, by storing the identification information of a culture container of another specimen cultured simultaneously in mutual correlation with the identification information of a culture container that contains a first specimen, the status of another specimen can be taken into consideration as a culture log of that first specimen.

The invention provides a cell culturing device, wherein each set of identification information is presented by a barcode, radio wave signal generation unit, optical signal generation unit or acoustic generation unit.

According to this invention, as a result of identification information being presented by a barcode, radio wave signal generation unit, optical signal generation unit or acoustic signal generation unit, identification information can be input by the input unit easily, reliably and in a non-contact manner.

BRIEF DESCRIPTION OF THE DRAWINGS

FIGS. 8A to 8C are drawings that show an example of the data stored in a database 44.

FIGS. 9A to 9C are examples of a search list in the case of data being written in database 44 based on the flow chart shown in FIG. 5.

BRIEF DESCRIPTION OF THE REFERENCE SYMBOLS

1: Hospital, 2: Culturing center, 20: Cell culturing system, 30: Terminal device, 31: Barcode reader (input unit), 32: LAN, 40: Managing server, 41: CPU (rewriting unit, collating unit, reading unit), 42: ROM, 43: RAM, 44: Database (memory unit), 45: First communication section, 46: Second communication section (output unit), 61,62: Terminal devices (cultured cell collating devices), 100: Cell culturing device, 101: Culture container, 102: Culturing chamber, 106, 107: Manipulators (medium replacement units)

BEST MODE FOR CARRYING OUT THE INVENTION

The following provides an explanation of an embodiment of the present invention with reference to the drawings.

Figure 1:
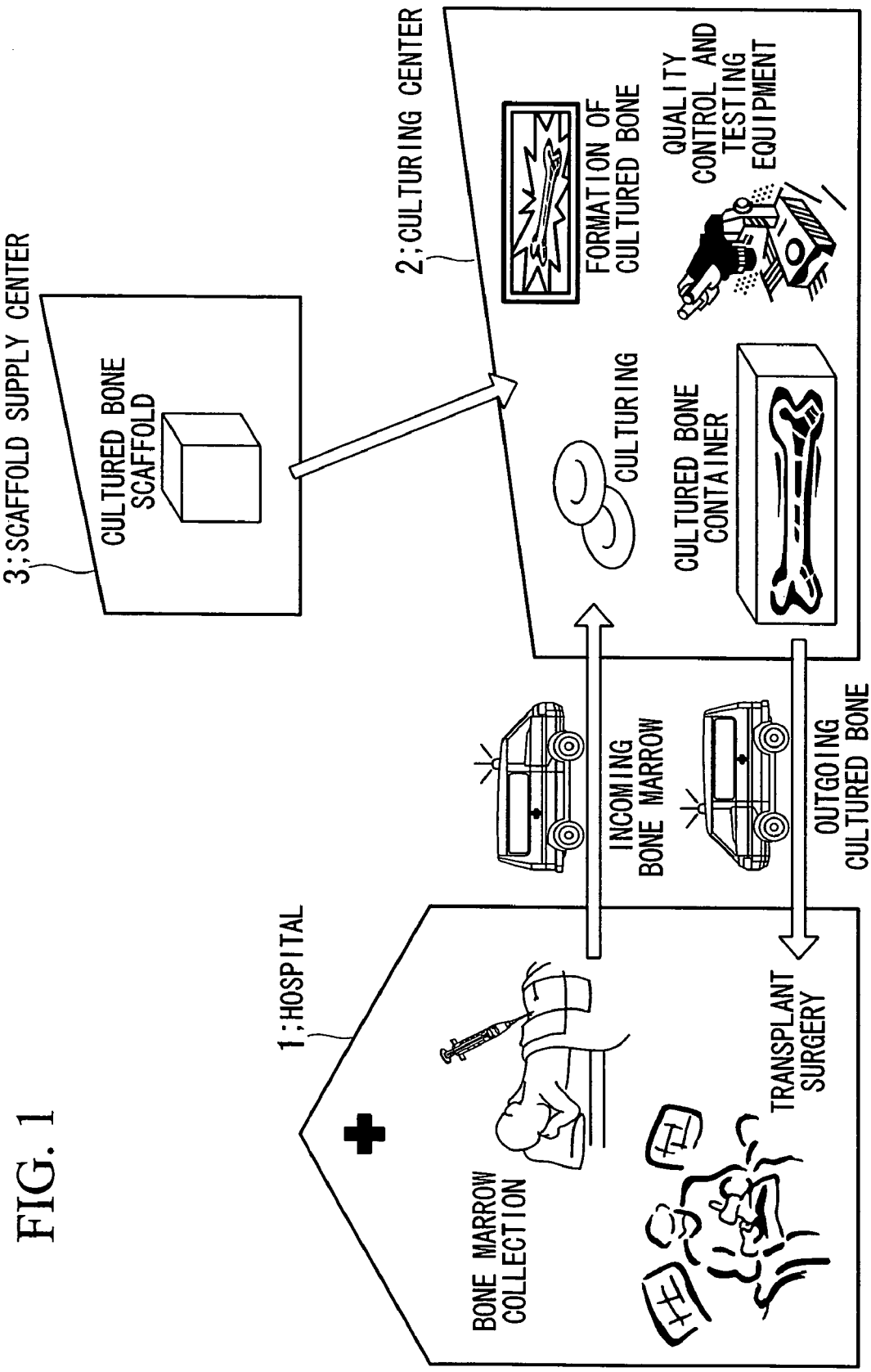
FIG. 1 is a drawing for briefly explaining a summary of a cell culturing system.

FIG. 1 is a drawing for briefly explaining a summary of a cell culturing system.

First, bone marrow collected from a patient at a hospital 1 is contained in a predetermined incoming transport container to which is attached a unique identification number, and then carried in to a culturing center 2 that forms cultured bone. Furthermore, the incoming transport container may be maintained at about 37° C. or 4° C. or may be frozen.

At culturing center 2, primary culturing in which mesenchymal stem cells contained in the incoming bone marrow are cultured, secondary culturing in which the cultured mesenchymal stem cells are added to a framework referred to as a scaffold to form cultured bone, and inspections to investigate whether or not bacteria or fungi are contained in the bone marrow or culture liquid are carried out, the ultimately formed cultured bone is contained in a predetermined outgoing transport container to which is attached a unique identification number, and then carried out to hospital 1. Furthermore, the outgoing transport container may be maintained at about 37° C. or 4° C. or may be frozen.

Furthermore, the scaffold used during secondary culturing is provided from a scaffold supply center 3.

Figure 2:
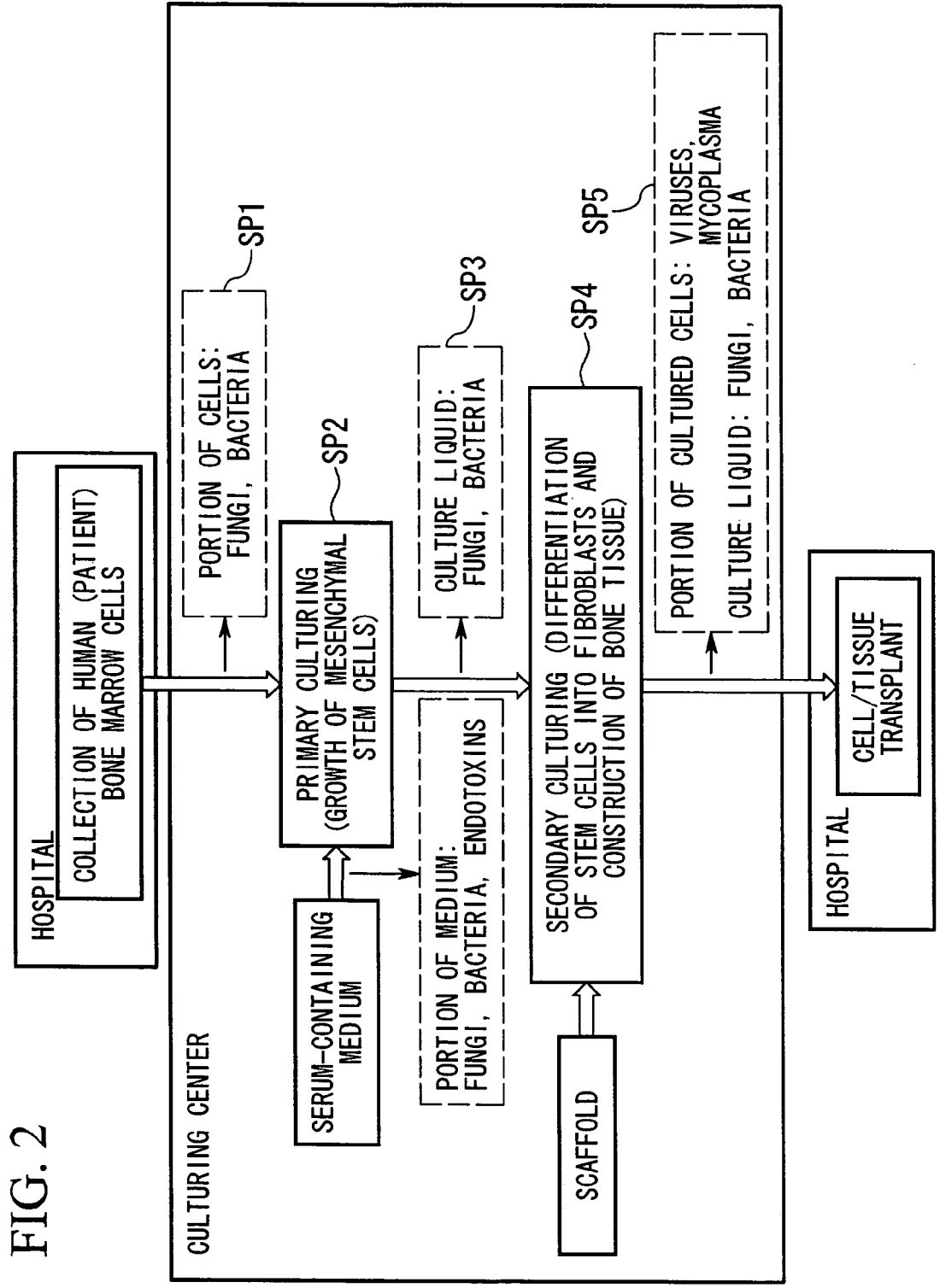
FIG. 2 is a drawing for explaining the culturing step performed in culturing tank 2.

Next, an explanation is provided of the culturing steps performed at culturing center 2 with reference to FIG. 2.

First, at culturing center 2, a portion of the bone marrow cells contained in an incoming transport container are removed, and an inspection is performed as to whether or not bacteria or fungi and so forth are contained in the collected bone marrow (Step SP1).

If there are no abnormalities in the inspection results, the process proceeds to the growth step for mesenchymal stem cells contained in the bone marrow liquid (Step SP2). Furthermore, this mesenchymal stem cell growth step is referred to as primary culturing. During this primary culturing, mesenchymal stem cells are grown by immersing bone marrow inspected in Step SP1 in medium containing inspected serum confirmed to be free of fungal and bacterial endotoxins and so forth (human or bovine serum may be used for this medium).

When the mesenchymal stem cells have grown to an adequate amount required for formation of cultured bone, an inspection is made as to whether fungi or bacteria are contained in these mesenchymal stem cells (Step SP3). If there are no problems as a result of this inspection, the process proceeds to secondary culturing for formation of cultured bone (Step SP4).

During secondary culturing, the mesenchymal stem cells grown by primary culturing are attached to a framework referred to as a scaffold.

This scaffold is a framework composed of a porous calcium phosphate such as β-TCP. As a result of attaching the mesenchymal stem cells to this scaffold, the mesenchymal stem cells consume the β-TCP to promote differentiation of fibroblasts resulting in formation of bone tissue. Furthermore, growth factor and so forth may be added at this time to further promote fibroblast differentiation. Furthermore, a scaffold such as hydroxyapatite and so forth may also be used instead of the aforementioned β-TCP.

Cultured bone that has been formed in this manner is sent to a pre-shipment inspection step in which the cultured bone is inspected prior to being shipped as to whether it contains viruses, mycoplasma or fungi or bacteria in the culture liquid (Step S5), and if there are no abnormalities found, it is transferred to a predetermined transport container and sent to hospital 1.

Figure 3:
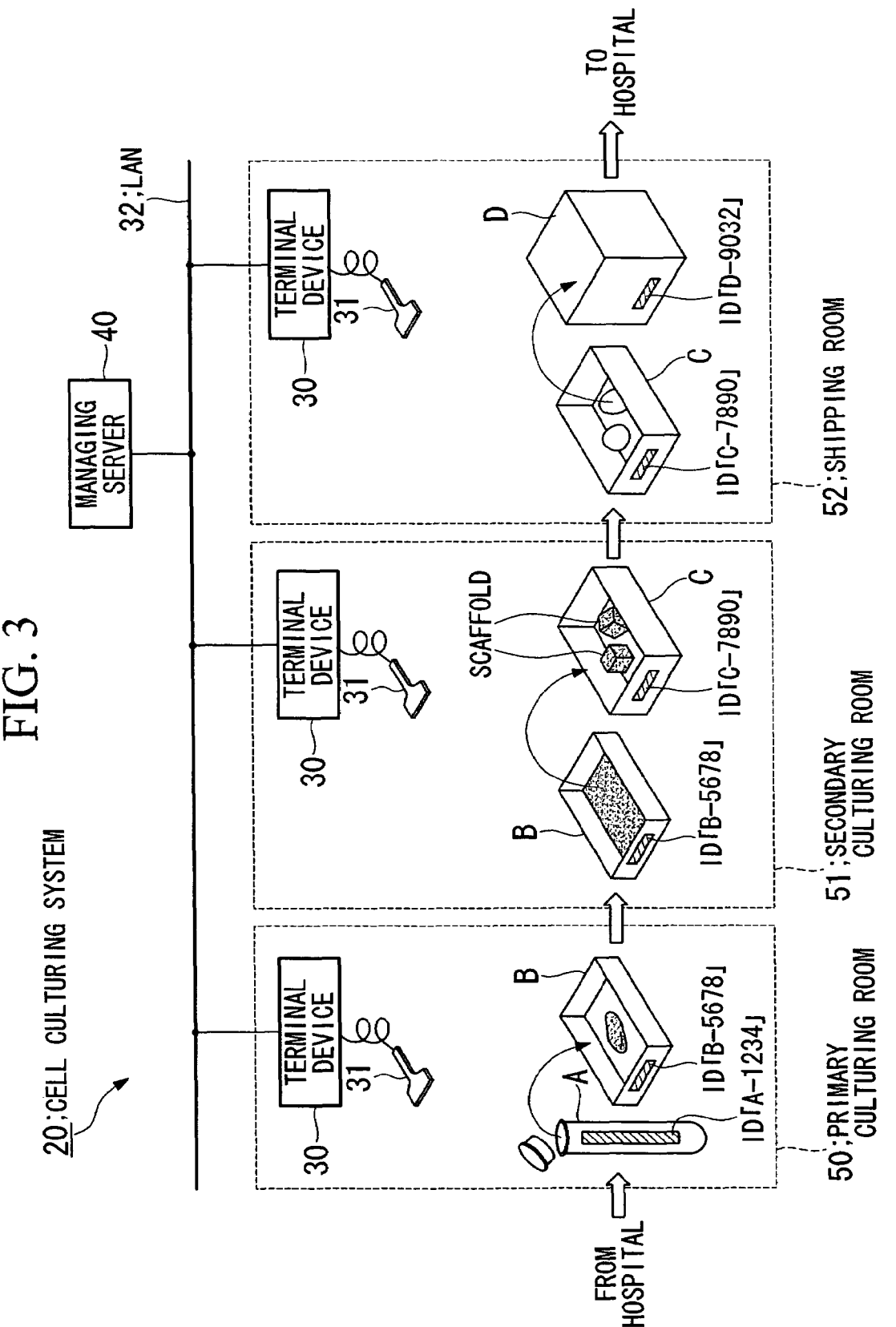
FIG. 3 is a drawing that shows the overall constitution of a cell culturing system in an embodiment of the present invention constructed within culturing center 2.

Next, an explanation is provided of a cell culturing system according to an embodiment of the present invention with reference to FIG. 3.

FIG. 3 is a drawing that shows the overall constitution of a cell culturing system in an embodiment of the present invention that is constructed within culturing center 2.

Cell culturing system 20 is composed of terminal devices 30 installed as necessary in a plurality of culturing rooms, inspection rooms and so forth present in culturing center 2, and a managing server 40 that performs centralized management of information transmitted from each terminal device 30.

Each terminal device 30 and managing server 40 is connected by means of a local area network (LAN) 32 that allows sending and receiving of information between each terminal device 30 as well as sending and receiving of information between each terminal device 30 and managing server 40.

Furthermore, in FIG. 3, an example is shown of terminal devices 30 respectively installed in a culturing room where the primary culturing shown in FIG. 2 is performed, a culturing room where secondary culturing is performed, and a shipping room where the formed cultured bone is shipped from the culturing center.

The aforementioned terminal device 30 is a device such as a personal computer, and is equipped with a display section not shown that displays messages and menus, an input section such as a keyboard not shown that inputs information, and a barcode reader 31 for reading identification information shown with two-dimensional barcodes attached to each container used for culturing and so forth.

Figure 4:
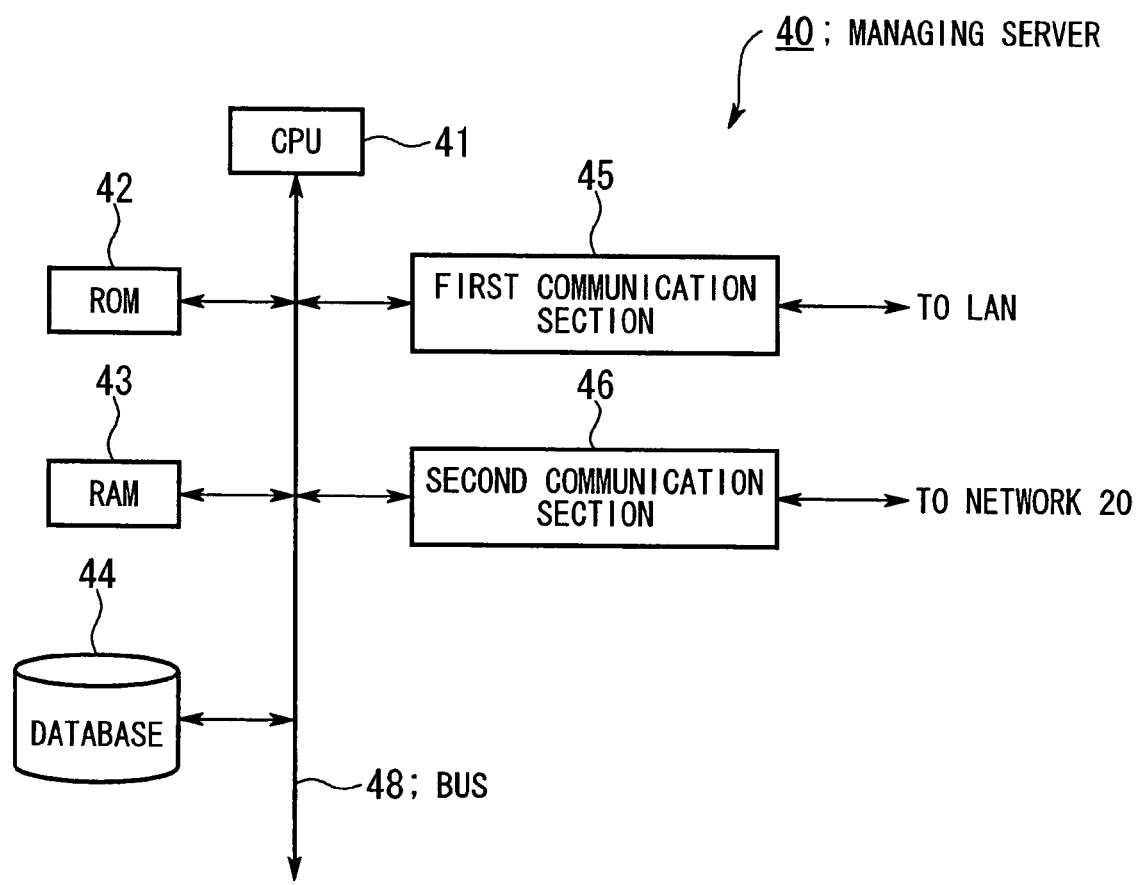
FIG. 4 is a drawing that shows the internal constitution of a managing server 40.

In addition, as shown in FIG. 4, managing server 40 is provided with a CPU (central processing unit) 41 that controls the entire operation of the server, ROM 42 in which programs run by CPU 41 are stored, RAM 43 that is used for arithmetic processing by CPU 41, database 44, a first communication section 45 for connecting with LAN 32 constructed within culturing center 2, and a second communication section 46 for connecting to a network 70 to be described later by means of a public line network. In addition, each of these sections 41 through 46 are connected via a bus 48, and are composed to as to allow the sending and receiving of information.

Identification information (ID numbers) of all containers used during formation of cultured bone of a patient are registered in the aforementioned database 44 in mutual correlation for each patient. Furthermore, details regarding the data stored in this database 44 are described later.

In addition, database 44 should be a storage medium that can be read by a computer, examples of which include a semiconductor memory or magnetic disk, or a portable recording medium such as an optical disk (CD-ROM/R/RW, DVD-ROM, DVD-R/RW, DVD-RAM etc.), a magnetooptical disk (MO, MD, etc.), magnetic recording medium (HDD, FD, magnetic tape, etc.) or semiconductor memory (flash memory such as MS or SD card, or FeRAM). Alternatively, database 44 may be composed by recording medium that can be read and written by a computer by combining these.

The following provides an explanation of the various work performed from carrying in the bone marrow to shipping the cultured bone in cell culturing system 20 composed in the manner described above.

Here, an explanation is provided of the case in which bone marrow collected for patient α is contained in an incoming transport container A to which a unique ID number "A-1234" is attached in the form of a two-dimensional barcode, and then transported to culturing center 2 from hospital Y.

At culturing center 2, a portion of the bone marrow of patient α contained in incoming transport container A is used for inspection, and if there are no problems in this inspection, the bone marrow is transferred to culturing room 50 (to be referred to as primary culturing room 50) where primary culturing is performed in the next step while still contained in incoming transport container A.

In primary culturing room 50, work is performed in which the bone marrow contained in incoming transport container A is transferred to a culture container B to which is attached a unique ID number "B-5678" in the form of a two-dimensional barcode.

Here, during transfer to culture container B, a worker reads the ID number attached to the containers before and after transfer, namely incoming transport container A and culture container B, with a barcode reader 31 of terminal device 30 installed in primary culturing room 50.

As a result, ID number "A-1234" of incoming transport container A and ID number "B-5678" of culture container B are input into terminal device 30. Continuing, when the worker performs a transmission procedure, input ID numbers "A-1234" and "B-5678" are transmitted to managing server 40 via LAN 32.

The two ID numbers are then supplied to CPU 41 via first communication section 45 of managing server 40 shown in FIG. 4. CPU 41 then performs processing based on the flow chart shown in FIG. 5.

Namely, when CPU 41 receives an ID number ("YES" in step SP11), CPU 41 judges whether or not any of the received ID numbers are already stored in database 44 (Step SP12).

Figure 6A:
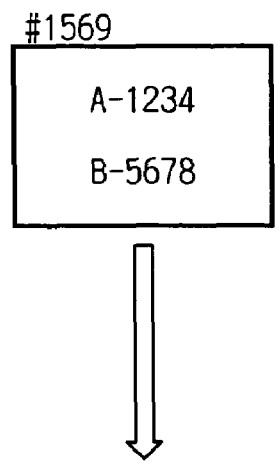
FIGS. 6A to 6C are drawings that show an example of the data stored in a database 44.

As a result, since neither ID number that has been received is stored in database 44 ("NO" in Step SP12), the two ID numbers that have been received, namely "A-1234" and "B-5678", are written into a predetermined memory area of database 44 in mutual correlation, for example memory address "#1569". As a result, data is written into database 44 as shown in FIG. 6A.

Continuing, when growth of the mesenchymal stem cells has proceeded to an adequate degree in primary culturing room 50, culture container B is transferred to secondary culturing room 51 where secondary culturing is performed in this secondary culturing room 51.

In secondary culturing room 51, work is first performed in which the mesenchymal stem cells contained in culture container B are transferred to a culture container C for secondary culturing.

At this time, a worker reads the ID number attached the containers before and after transfer, namely the two-dimensional barcode attached to culture container B and the two-dimensional barcode attached to culture container C, with a barcode reader 31 provided in secondary culturing room 51. As a result, the ID number of culture container B, "B-5678", and the ID number of culture container C, "C-7890", are input. Moreover, when a worker performs a transmission procedure from the input section of terminal device 30, the two input ID numbers are transmitted to managing server 40 via LAN 32.

As a result, the two ID numbers are supplied to CPU 41 via first communication section 45 within managing server 40.

When CPU 41 receives the two ID numbers consisting of "B-5678" and "C-7890" ("YES" in Step SP11), it searches the inside of database 44 using the received ID numbers as key words and judges whether or not matching ID numbers have been stored (Steps SP12 and SP13).

As a result, since the ID number of culture container B, "B-5678", is already stored in database 44 ("YES" in Step SP13), it continues by acquiring the memory address, "#1569", where this ID number "B-5678" is written (Step S15).

Continuing, CPU 41 then writes the two received ID numbers, namely "B-5678" and "C-7890", to a predetermined storage area of database 44, for example memory address "#3267" (Step S16).

Continuing, CPU 41 correlates memory address "#3267" where the ID numbers have been written with the memory address "#1569" acquired in Step S15, and stores them in a predetermined memory area of database 44 (Step S17).

Figure 6B:
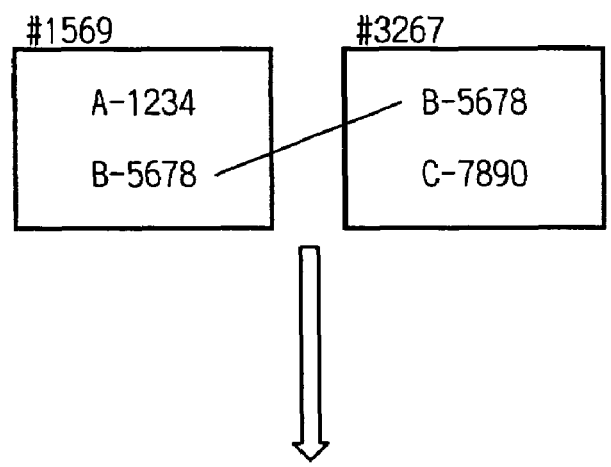

As a result, as shown in FIG. 6B, the ID numbers of all containers used in the process from carrying in of bone marrow of patient α to formation of cultured bone are stored in database 44 in mutual correlation.

Continuing, when cultured bone has been formed to an adequate degree (when fibroblasts have grown) in the secondary culturing step, culture container C is transferred to the shipping room, and preparations for shipping the cultured bone to hospital Y are carried out in this shipping room 52.

At this time, a worker performs the work of transferring the cultured bone from culture container C to outgoing transport container D for shipment. Thus, the worker reads the ID numbers attached to the containers before and after transfer, namely the two-dimensional barcode attached to culture container C and the two-dimensional barcode attached to outgoing transport container D, with barcode reader-31 provided in shipping room 52. As a result, the ID number of culture container C, "C-7890", and the ID number of outgoing transport container D, "D-9032", are input, and when a transmission procedure is subsequently performed, these ID numbers are transmitted to managing server 40 via LAN 32.

As a result, the two ID numbers are sent to CPU 41 in managing server 40 via first communication section 45. CPU 41 performs processing based on the flow chart of FIG. 5 in the same manner as previously described, and as a result, together with writing the two received ID numbers of "C-7890" and "D-9032" to memory address "#5879", stores them in memory by correlating this memory address "#5879" with memory address "#3267" of database 44 to which "C-7890" had previously been written.

Figure 6C:
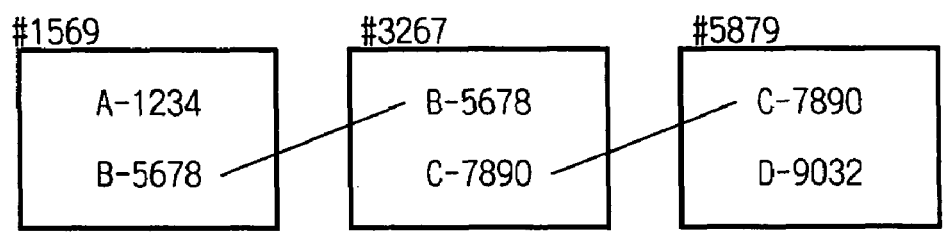

As a result, as shown in FIG. 6C, the ID numbers of all containers used in the process from carrying in of bone marrow of patient α to shipment of cultured bone are stored in a predetermined memory area of database 44 in mutual correlation.

As has been described above, in the present embodiment, since ID numbers attached to containers before and after transfer are correlated and accumulated in database 44 whenever cultured cells are transferred between containers containing cultured cells, which container the cultured cells of patient α are currently contained in, and which containers were used to culture the cells can be rapidly determined.

Furthermore, by adding information on the steps in which containers were used to unique identification information in the form of ID numbers attached to each container, the searching processing performed in Step SP12 can be carried out rapidly and easily.

For example, in the aforementioned embodiment, an "A" as information indicating that the container is an incoming transport container is added to the ID number of incoming transport container A, a "B" as information indicating that the container is used for primary culturing is added to the ID number of culture container B used in primary culturing, a "C" is similarly added to the ID number of culture container C, and a "D" is similarly added to the ID number of outgoing transport container D.

Thus, when searching for an ID number that has been received from database 44 in Step SP11, in the case of first searching for information that indicates the step such as ID number "C-7890", ID numbers to which a "C" has been added should first be extracted from database 44 followed by searching for an ID number that matches the ID number among the extracted ID numbers. In this manner, since it is possible to narrow down the data targeted by the search, searching processing can be performed extremely efficiently.

Figure 5:
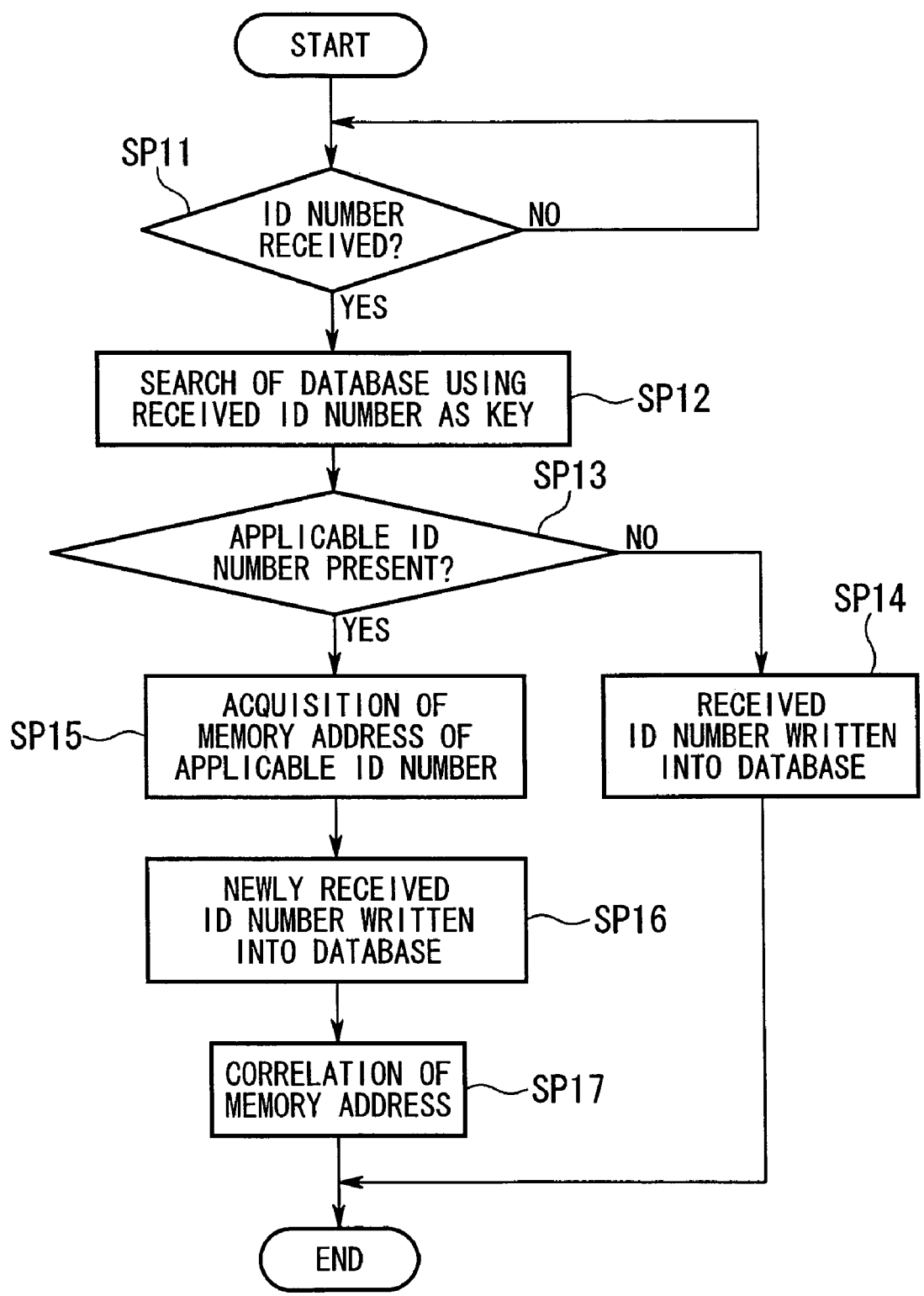
FIG. 5 is a flow chart that shows the operation of the cell culturing system according to an embodiment of the present invention.

In addition, by similarly adding information relating to the step to the ID number, in the case either of the two ID numbers received in Step SP11 of FIG. 5 was the ID number of incoming transport container A, both of the ID numbers that have been received can be judged to not be written in database 44 in Step SP13 without having to search database 44 in Step SP12. This is because incoming transport container A is information that was initially written in database 44.

In this manner, by judging whether or not either of two received ID numbers is the ID number of incoming transport container A, the received ID numbers can be rapidly judged to be new data that is not stored in database 44.

Other Embodiments

In addition, although all read ID numbers were managed in correlation in the aforementioned embodiment, ID numbers may instead be managed by correlating only the ID number of the most recent container and the ID number of the incoming transport container.

Figure 7:
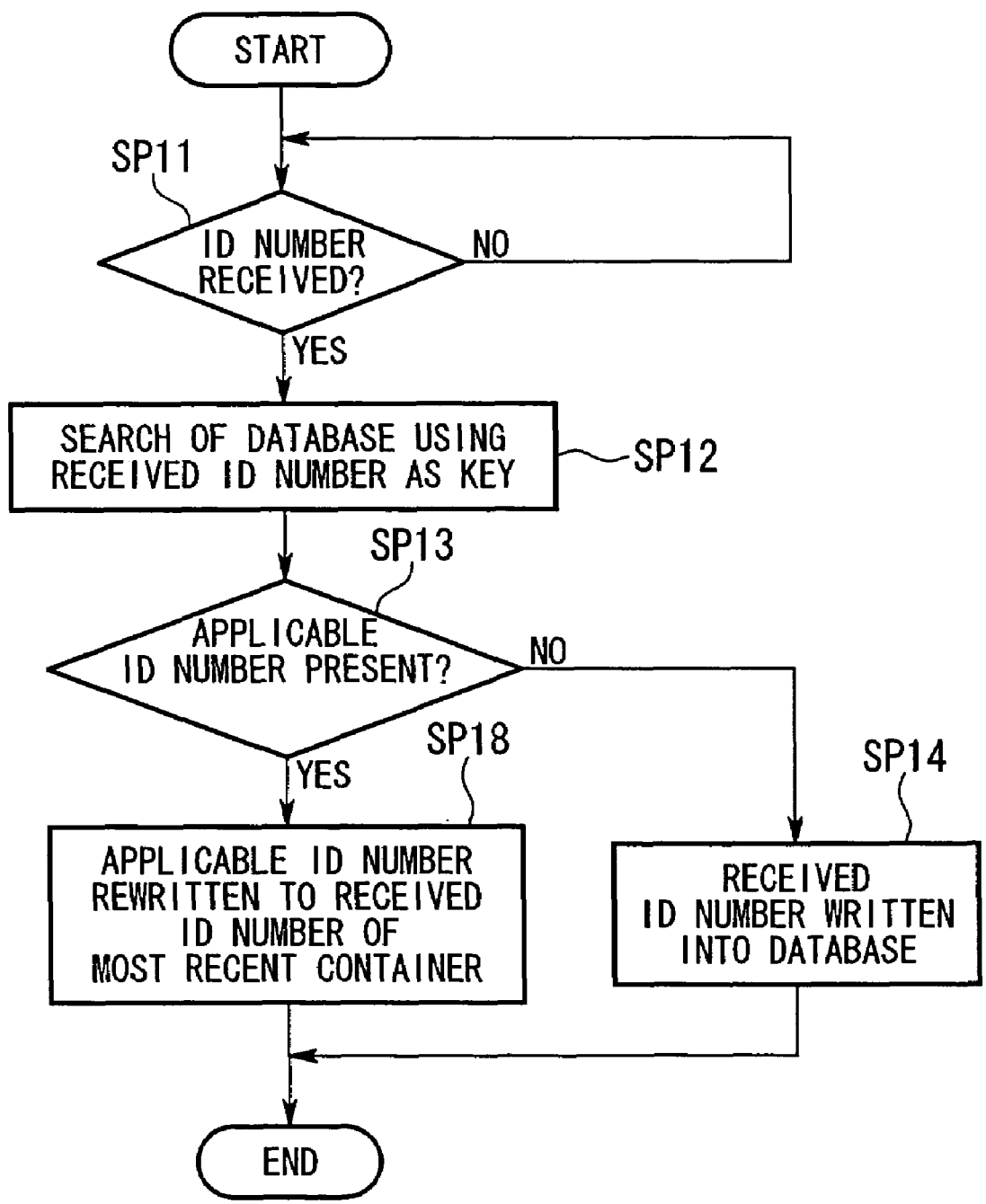
FIG. 7 is a flow chart that shows the operation of a cell culturing system according to another embodiment of the present invention.

In this case, instead of the processing of Steps SP15 through SP17 in FIG. 5, Step SP18 in FIG. 7 is carried out. Furthermore, Steps SP11 through SP14 are the same as in the previous embodiment.

The following explanation is provided using the example of the processing carried out in secondary culturing room 51. Here, CPU 41 of managing server 40 receives "B-5678" and "C-7890" in Step SP11, and as a result of the searching processing of Steps SP12 and SP13, obtained "B-5678" as the ID number.

In this case, CPU 41 rewrites the ID number "B-5678" previously written in database 44 to ID number "C-7890" of culture container C that it has just newly received (Step S18).

As a result, as shown in FIG. 8B, the ID number of incoming transport container A and the ID number of culture container C are correlated and stored in database 44. Furthermore, at this time, the ID number of culture container B that is no longer the most recent container is deleted from database 44.

Similarly, in the case ID number "C-7890" of culture container C and ID number "D-9032" of outgoing transport container D are received by CPU 41 of managing server 40 as a result of processing carried out in shipping room 52, ID number "C-7890" (see FIG. 8C) that was previously written in database 44 is rewritten to the new ID number "D-9032".

As a result, as shown in FIG. 8C, the ID number of incoming transport container A and the ID number of outgoing transport container D are correlated and stored in database 44.

In this manner, in the case any of the ID numbers received in Step SP11 have been previously stored in database 44, as a result of the previously written ID number being rewritten to the newly received ID number, the ID number of the most recent container and the ID number of the container first brought to culturing center 2, which is also the incoming transport container that has been correlated with the patient's ID, can be managed in correlation.

As a result, since the amount of data stored in database 44 can be reduced, together with being able to effectively utilize the available memory of database 44, the searching processing in Step SP12 can be carried out efficiently and rapidly.

In addition, in order to carry out the searching processing performed in Step SP12 shown in FIGS. 5 and 7 more rapidly, as shown in FIG. 9 for example, a search list showing the memory address where the ID number of the most recent container is stored (or in other words, the ID number of the container in which the cultured cells are currently contained) is generated, and searching processing may be carried out rapidly by referring to this search list during searching. Furthermore, FIG. 9 shows examples of search lists in the case of data being written in database 44 based on the flow chart shown in FIG. 5.

Furthermore, the aforementioned search list can be generated in the manner described below.

For example, when a new ID number is written to a predetermined memory address of database 44 in Step SP14 shown in FIG. 5 or 7, a search list is generated that correlates that memory address with the ID number of the most recent container that has been written.

In addition, in the case an ID number is written or an ID number is rewritten while additionally correlating with information previously written in database 44 in Steps S16 and S18, together with writing this data, the data of the previously generated search list is updated.

In addition, in cases in which bone marrow is brought in from a plurality of hospitals, hospital ID numbers may be managed together with the ID numbers of the incoming transport containers so that the aforementioned ID numbers are managed for each hospital. As a result, together with simplifying memory management, searching processing can be accelerated.

As has been described above, as a result of managing data for each hospital or generating a search list and so forth, even in the case an extremely large amount of data is stored in database 44, a single ID number can be searched for among that large amount of data extremely efficiently and in a short period of time. In addition, as a result of managing data in this manner, the collating processing to be described later can be carried out rapidly.

Furthermore, a constitution may be employed in which the aforementioned terminal device 30 may be a portable terminal device, and the portable terminal device is connected to LAN 32 via a wireless access point. More specifically, wireless access points and so forth are provided at various locations in culturing center 2 as necessary, and terminal device 30 transfers information to a wireless access point by infrared rays or radio waves and so forth belonging to the UHF to SHF bands. The wireless access points are relay points for information on a wireless LAN, and information transmitted in wireless form by these wireless access points is transferred to managing server 40 by way of wired LAN 32. In this manner, information is sent and received between portable terminal device 30 and order receiving server 40. Furthermore, an example of this type of portable terminal device is a handy terminal with barcode reader frequently used in distribution systems.

In addition, in the aforementioned explanation, although managing server 40 is provided in culturing center 2 and is connected to each terminal device 30 via LAN 32, it is not limited to this, but rather there are no particular restrictions on its installation site provide it can send and receive data with each terminal device 30 and carry out the processing like that described above.

Figure 10:
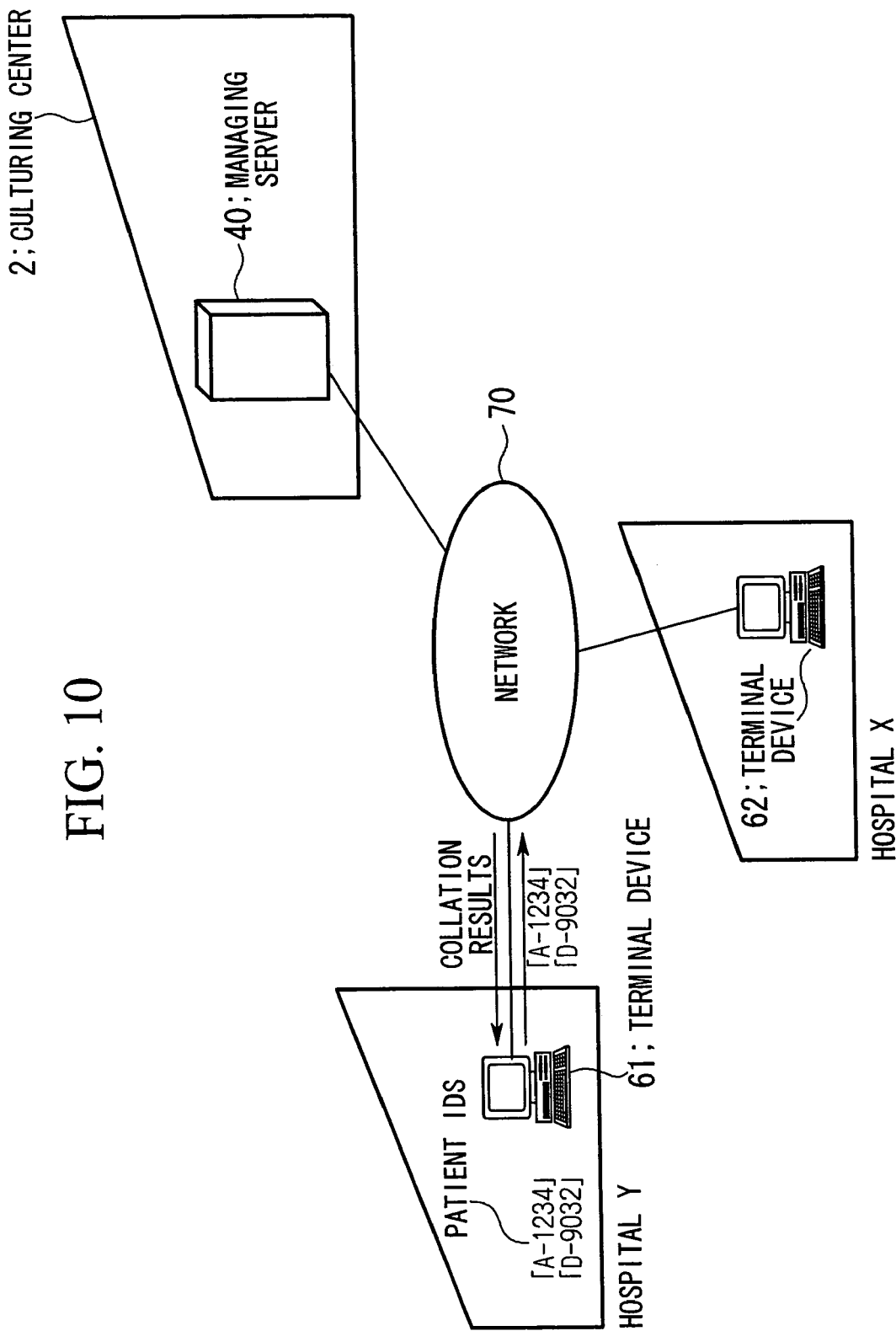
FIG. 10 is a drawing that shows the overall network composition of a cultured cell collating device according to an embodiment of the present invention.

Next, an explanation is provided of a cultured cell collating device according to an embodiment of the present invention with reference to FIG. 10.

Cultured bone that has been formed as a result of going through a culturing process as described above is contained in an outgoing transport container D to which is attached the ID number "D-9032" in shipping room 52, and then shipped from culturing center 2 to hospital Y.

At hospital Y that has received the cultured bone contained in said outgoing transport container D, the cultured bone that has been received (and more precisely, incoming transport container D in which the culture bone is contained) is collated to accurately determine whether or not it has been cultured from bone marrow collected from patient α.

The following provides an explanation of this collation procedure.

FIG. 10 is a drawing showing the overall network composition of a cultured cell collating device as claimed in an embodiment of the present invention.

In this drawing, managing server 40 provided in cell culturing system 20 is connected to a network 70 via the second communication section 46 shown in FIG. 4. In addition, reference symbols 61 and 62 indicate terminal devices installed in hospital X and hospital Y, respectively, and are connected to network 70 via a public line.

Here, terminal device 30 has a CPU that controls each section within the terminal device, ROM in which various programs are stored that are run by the CPU, RAM for temporarily storing data generated during the course of processing by the CPU, a communication section for exchanging information with managing server 40 via a network 20, a display section that displays various messages and menus, and an input section such as a keyboard or mouse that inputs information, and in the case network 70 is in the form of the Internet, application software of a WWW browser is installed that enables receiving of Internet service.

In the aforementioned composition, at hospital Y that has received cultured bone contained in an outgoing transport container D having the ID number "D-9032" in the form of cultured bone cultured from bone marrow collected from patient α, the following collation procedure is carried out in order to confirm whether or not the acquired cultured bone matches patient α.

First, ID number "D-9032" attached to outgoing transport container D in which the cultured bone is contained, and ID number "A-1234" of incoming transport container A in which bone marrow of the corresponding patient α is contained, are input by operating the input section of a terminal device 61 at hospital Y followed by carrying out a transmission procedure. As a result, ID number "D-9032" and ID number "A-1234" are transmitted to managing server 40 of culturing center 2 via network 70 as ID numbers for collation.

Furthermore, correlation between the aforementioned incoming transport container A and patient a can be obtained easily by, for example, recording the ID number of incoming transport container A in the medical record of patient ax when bone marrow is collected.

CPU 41 of the managing server that has received the ID numbers for collation composed of the aforementioned ID numbers first reads from database 44 all of those ID numbers and ID numbers correlated with those ID numbers by using the ID number of outgoing transport container D as the keyword (Step SP21).

As a result, the data shown in FIG. 6C is read from database 44 in the case of having been stored in database 44 in a data format like that shown in FIGS. 6A to 6C, while the data shown in FIG. 8C is read from database 44 in the case of having been stored in database 44 in a data format like that shown in FIGS. 8A to 8C.

Continuing, CPU 41 then judges whether or not the other ID number received as an ID number for collation, namely ID number "A-1234" of incoming transport container A, is present in the data that has been read (Step SP22).

In the case ID number "A-1234" of incoming transport container A is present in the data that has been read, namely in the case the two ID numbers received as ID numbers for collation are stored in database 44 in mutual correlation, the first pair of ID numbers received for collation is judged to be a proper combination, and results indicating such are transmitted to terminal device 31 of hospital Y via network 70 in the form of collation results (Step SP23). As a result, a message indicating a proper combination is displayed on terminal device 30 of hospital Y.

On the other hand, in the case the two ID numbers received as ID numbers for collation in Step SP22 are not stored in database 44 in mutual correlation, they are judged to be an improper combination, and results indicating such are transmitted to terminal device 61 in the form of collation results.

As a result, a message indicating that the combination of two ID numbers input as ID numbers for collation is an improper combination is displayed on the display section of terminal device 61.

As has been described above, since collation of a patient and cultured bone can be carried out easily simply by inputting an ID number attached to an incoming transport container containing a patient's bone marrow and an ID number attached to an outgoing transport container in which cultured bone has been contained, and transmitting those ID numbers from a hospital to a managing server, together with significantly reducing the time and bother associated with collation, extremely reliable collation results can be obtained. As a result, patients can be prevented from being mixed up.

Furthermore, the aforementioned collation processing may be carried out by terminal device 61 instead of managing server 40.

Figure 11:
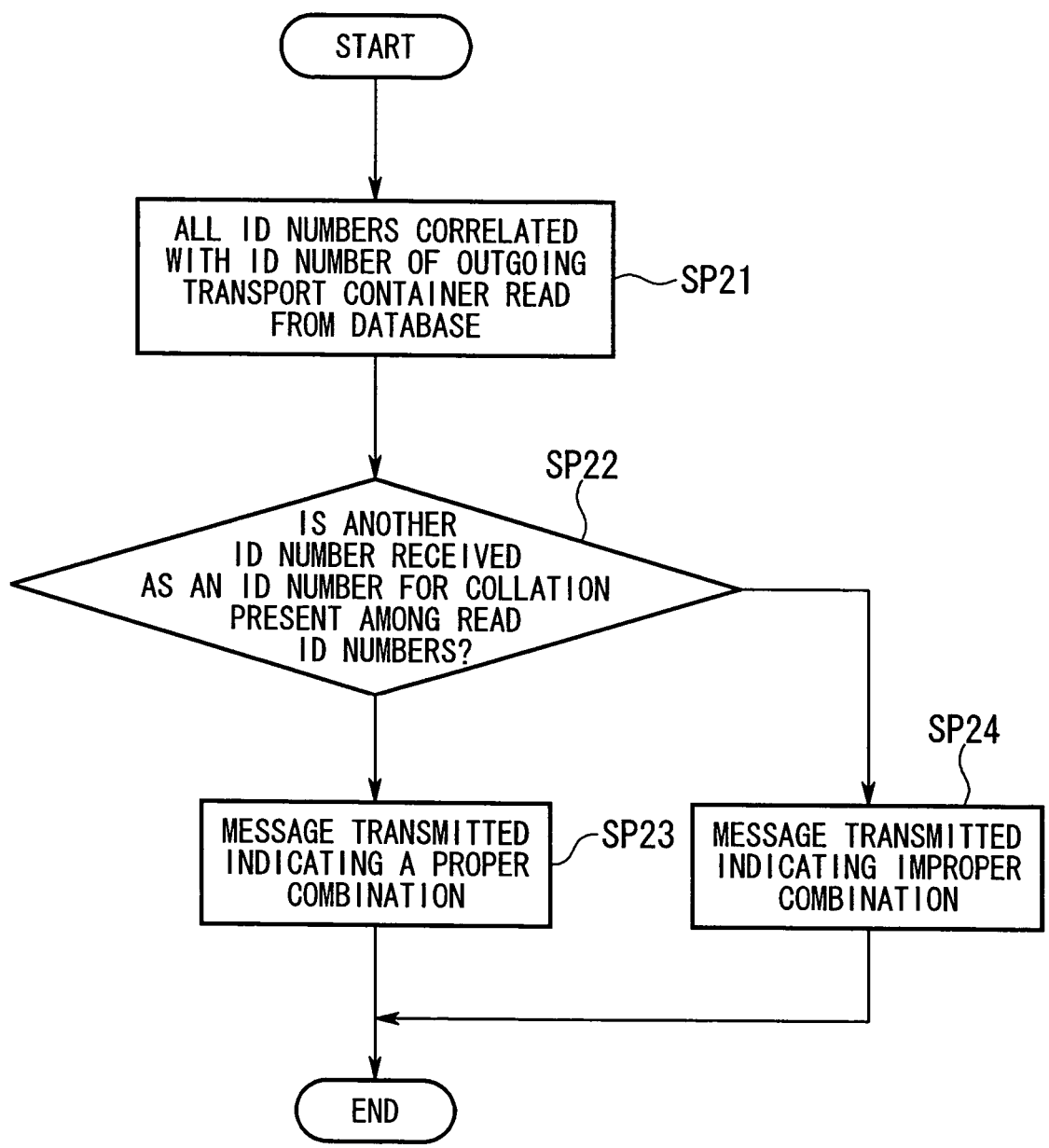
FIG. 11 is a flow chart that shows the operation of cultured cell collating device according to an embodiment of the present invention.

Namely, the aforementioned processing can be realized by enabling access to database 44 of managing server 40 from terminal device 61, storing a program for realizing the processing of Steps SP21 through SP23 of FIG. 11 in the ROM equipped in terminal device 61, and having the CPU of terminal device 61 load and run the program stored in ROM.

Although the above has provided a detailed description of an embodiment of the present invention with reference to the drawings, the specific constitution is not limited to this embodiment, but rather designs and so forth are also included that are within a scope that does not deviate from the gist of the present invention.

For example, although a cultured bone formation system that forms cultured bone was explained as an example of a cell culturing system of the present invention in the aforementioned embodiment, the present invention is not limited to this, but rather can be applied to any cell culturing system provided it is a system that cultures cells and the containers used in the step in which cells are cultured are changed at least once.

For example, the present invention can be applied to a system in which chondrocytes are brought in after being collected from a patient, cultured, grown and then carried out of the system.

Figure 12:
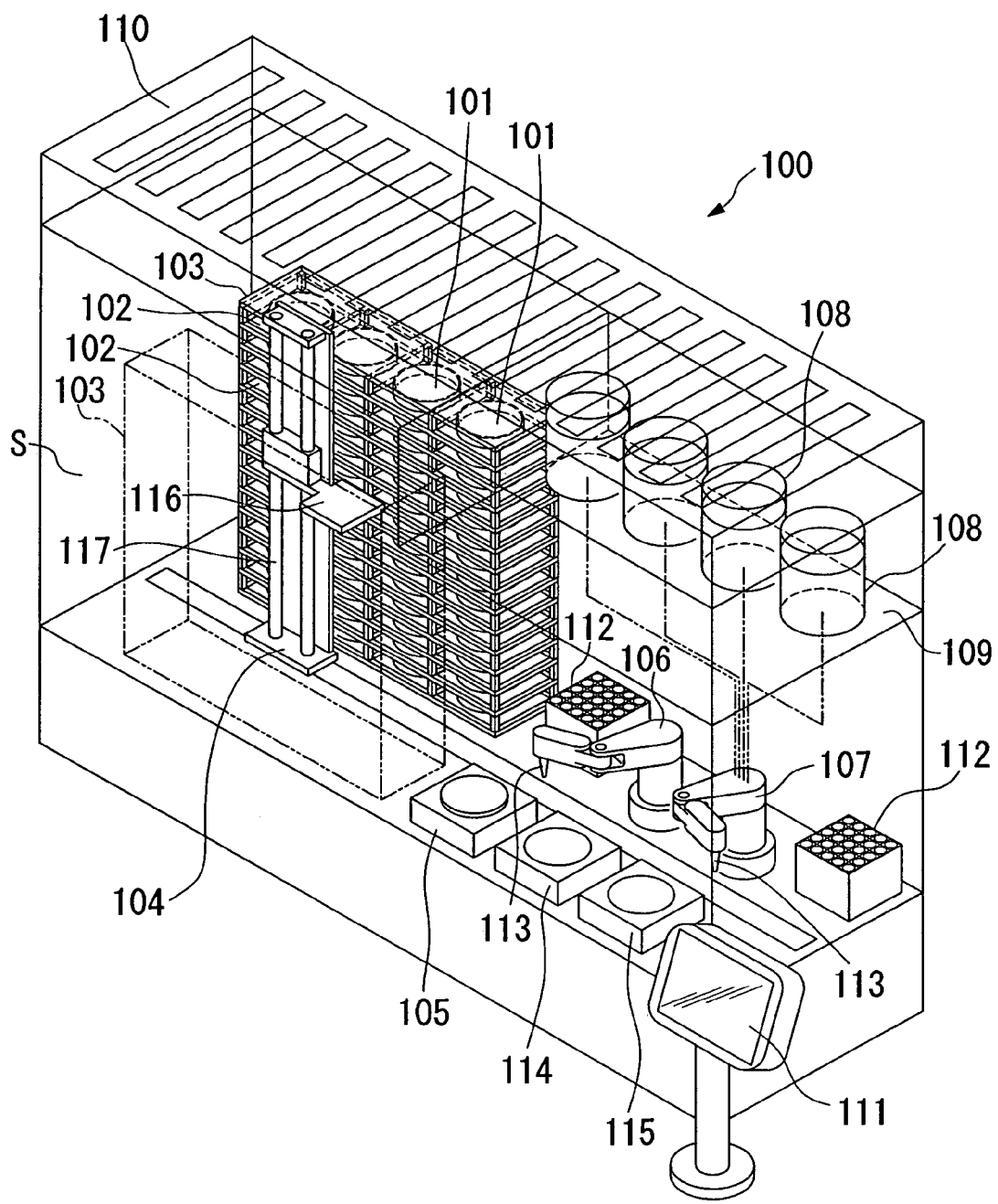
FIG. 12 is a perspective view schematically showing a cell culturing device according to an embodiment of the present invention.

Next, the following provides an explanation of a cell culturing device according to an embodiment of the present invention with reference to FIG. 12.

As shown in FIG. 12, a cell culturing device 100 according to the present embodiment is provided with, in a space S sealed by a transparent wall material that allows observation from the outside, a cell culturing section 103 provided with a plurality of culturing chambers 102 capable of individually housing a plurality of culture containers 101, a traveling carriage 104 capable of traveling within the space S, a centrifuge 105 for centrifugally separating cells within culture containers 101, two manipulators (medium replacement units) 106 and 107 that replace medium and so forth, and a refrigeration chamber 109 that maintains containers 108, which store medium, trypsin and other proteases and growth factor, in a low-temperature state of, for example, 4° C.

In the drawing, reference symbol 110 indicates an air purification section that sends a clean, downward air flow through space S, reference symbol 111 indicates a control device having a touch panel type of monitor, reference symbol 112 indicates pipette holders that house pipettes 113 which are removably attached to the ends of manipulators 106 and 107 and are replaced for each culture container 101, and reference symbols 114 and 115 indicate work stages on which culture containers 101 are placed during medium replacement.

Culture container 101 is, for example, a container in the shape of a round Petri dish that is open on top so as to be able to contain medium and cells inside. Unique identification information is imparted to each culture container 101 by means of barcodes (not shown) In addition, various sizes of culture containers 101 are made available so that the cells are transferred to a culture container having a larger bottom surface area as the culturing process proceeds in order to impart to the cells the optimum environment corresponding to the particular step of the cell culturing process.

Each culturing chamber 102 of the aforementioned cell culturing section 103 is made to be isolated from other culturing chambers 102 and so forth by being sealed by an access opening on the side of traveling carriage 104 and dividing walls. In addition, predetermined culturing conditions such as temperature (e.g., 37±0.5° C.), humidity (e.g., 100%) and $CO_2$ concentration (e.g., 5%) are maintained within each culturing chamber 102. In addition, sensors (not shown) for detecting the actual temperature, humidity, $CO_2$ concentration and other information within these culturing chambers 102 are respectively provided in these culturing chambers 102.

Moreover, a barcode (not shown), in which is recorded unique identification information, is attached to each culture container 102.

A platform 116 on which a culture container is placed, an elevator mechanism 117 that raises and lowers platform 116, a transfer mechanism not shown that is installed on platform 116, and a barcode reader (input unit) not shown that is similarly installed on platform 116, are provided on the aforementioned traveling carriage 104. The transfer mechanism is composed so as to insert and remove culture containers 101 to and from culturing chambers 102 when platform 116 has been positioned at a culturing chamber 102. In addition, the barcode reader is composed so as to read barcodes attached to culture containers 101 and barcodes attached to culturing chambers 102 in which said culture containers 101 are to be housed or have been housed, whenever a culture container 101 is inserted into or removed from a culturing chamber 102, or at least when a culture container 101 is inserted into a culturing chamber 102.

A medium information detection unit (not shown) is provided in a container 108 that stores the aforementioned medium which detects medium information such as the dissolved oxygen concentration or sugar content of the medium. In addition, containers 108 that store medium, trypsin, growth factor and so forth are connected to manipulator 107, and medium and so forth is allowed to be loaded into culture containers 101 in manipulator 107 by the opening and closing of a valve not shown.

Together with storing in memory culturing menus for each of the cells, the aforementioned control device 111 controls the operation of traveling carriage 104, manipulators 106 and 107, valves and so forth corresponding to each of the menu parameters. In addition, a database (not shown) is provided within control device 111, and identification information of culture containers 101 and culturing chambers 102 input with a barcode reader is stored in correlation with each of the cells. In addition, control device 111 is also equipped with a calendar function that is capable of storing the dates of medium replacement and other work performed on the cells according to the menu parameters in a database. In addition, medium replacement information including the amounts and types of replaced media as well as growth factor, vitamins and so forth supplied is extracted from the menu parameters and stored in correlation with the identification information of culture containers 101 when the medium is replaced.

In addition, actual culturing chamber information such as temperature, humidity and $CO_2$ concentration within culturing chambers 102 that has been detected by the aforementioned sensors is also stored in the database in correlation with the identification information of culture containers 101.

The following provides an explanation of the operation of cell culturing device 100 as claimed in the present embodiment composed in this manner.

When bone marrow liquid collected from a patient is loaded into cell culturing device 100 according to the present embodiment, the bone marrow liquid is transported to a centrifuge by traveling carriage 104 while contained in a predetermined culture container 101 or centrifuge container (not shown) where bone marrow cells having a high specific gravity are extracted by centrifugation.

The extracted bone marrow cells are loaded into a suitable culture container 101 and mixed a with pre-prepared medium. A portion of the medium is removed and sent to infection testing. Culture container 101 in which bone marrow cells and medium have been loaded is placed on platform 116 of traveling carriage 104 and then transported to an empty culturing chamber 102. When culture container 101 is loaded into culturing chamber 102, identification information is read from the barcodes attached to culture container 101 and culturing chamber 102 by a barcode reader provided on platform 116, and this identification information is then stored in the database of control device 111 in correlation. Furthermore, the results of infection testing are suitably stored in the database in correlation with the aforementioned identification information.

While in this state, the bone marrow liquid and medium are maintained at predetermined temperature, humidity, $CO_2$ concentration and other culturing conditions inside culturing chamber 102. Temperature and other culturing chamber information within culturing chamber 102 at this time are detected by sensors either continuously or at predetermined times, and then stored in the database in correlation with the identification information of culturing chamber 102.

As a result, the cells are primarily cultured under fixed culturing conditions over a predetermined period of time. Culture container 101 is removed from culturing chamber 102 by the operation of the transfer mechanism at predetermined replacement times during the course of cell culturing. At this time, the identification information of culture container 101 and culturing chamber 102 is read. In the case the read identification information of either culture container 101 or culturing chamber 102 matches identification information previously stored in memory, that identification information is not newly written into the database, while in the case identification information that does not match is present, that identification information is additionally stored in the database in correlation with other identification information.

The culture container 101 that has been removed from culturing chamber 102 is transported by traveling carriage 104 and then placed on a first work stage 114. There, manipulator 106, which has been installed with a new pipette 113 from pipette holder 112, transports said pipette 113 to culture container 101, and the end of pipette 113 contacts and aspirates the medium within culture container 101. By making pipette 113 to have a sufficient internal volume, the aspirated medium can be contained in pipette 113 only and can be discarded along with pipette 113. As a result, adherence of medium to manipulator 106 can be prevented.

Furthermore, the aspirated waste medium may also be sent to infection testing without discarding. At this time, together with also imparting identification information to pipette 113 with a barcode, identification information read by a barcode reader not shown may be stored in the database in correlation with identification information of culture container 101.

While in this state, in the case of requiring further culturing within the same culture container 101, said culture container 101 is transported on a second work stage 115 by traveling carriage 104, and fresh medium and so forth is supplied to culture container 101 by the operation of manipulator 107 and a valve. When medium and so forth has been supplied, the amount and type of medium along with dissolved oxygen concentration, sugar content and other medium information relating to the contents of the medium that has been detected by the medium information detection unit are stored in the database in correlation with the identification information of culture container 101. Culture container 101 to which fresh medium has been supplied is then again transported to an empty culturing chamber 102 by traveling carriage 104, and identification information is input when it is inserted into that culturing chamber 102.

In the case it is necessary to change culture container 101 while in the aforementioned state, culture container 101 is transported to second work stage 115 by traveling carriage 104 where trypsin is supplied from trypsin container 108 by the operation of manipulator 107 and a valve. As a result, cells adhered to the bottom of culture container 101 are separated from the container. While in this state, culture container 101 is again transferred to centrifuge 105 by the operation of traveling carriage 104 where the cells are separated from the medium containing trypsin. The separated medium is discarded by being aspirated by the operation of manipulator 106 after culture container 101 has been transferred to work stage 114. The separated cells are aspirated into pipette 113 by the operation of manipulator 106 on which pipette 113 has been replaced, and then loaded into a new culture container 101 prepared on the other work stage 115 by the operation of traveling carriage 104. In addition, fresh medium is supplied to this culture container 101 by the operation of manipulator 107 and a valve. The types, amounts and medium information of the trypsin, medium and so forth that have been added are stored in the database.

The new culture container 101 containing cells is transported to an empty culturing chamber 102 by the operation of traveling carriage 104 where it is housed in culturing chamber 102 after its identification information has been read by the operation of the barcode reader. The identification information that has been read is then added to the database.

When a predetermined culturing period has been completed, trypsin is added to and mixed in culture container 101 after medium has been discarded from culture container 101 in the same manner as previously described. As a result, mesenchymal stem cells that have been grown and become adhered to the bottom of culture container 101 are separated from the bottom of culture container 101. The mesenchymal stem cells that have been separated from culture container 101 in this manner are then extracted as a result of being applied to centrifuge 105.

After being adjusted to the desired number of cells, the extracted mesenchymal stem cells are mixed in culture container 101 into which bone filler and a suitable medium have been loaded. The bone filler may be contained in advance in culture container 101, or it may be loaded into culture container 101 by manipulator 106 or 107. The type and amount of bone filler loaded into culture container 101 are stored in memory in correlation with identification information of culture container 101.

In actuality, mesenchymal stem cells are adhered to the bone filler and then loaded into the medium. By maintaining the mixed mesenchymal stem cells and medium at a predetermined temperature, humidity, $CO_2$ concentration and other culturing conditions in the same manner as previously described, the cells are secondarily cultured under fixed culturing conditions over a predetermined period of time.

In this secondary culturing step as well, the medium is replaced periodically and a portion of the loaded medium along with a portion of the medium to be discarded are respectively sent to infection testing in the same manner as the primary culturing step. After a predetermined culturing period has elapsed, specimens are extracted for quality testing and infection testing in preparation for shipment, and the cultured bone that has been produced is sealed in a predetermined sealed container (not shown) and supplied as the finished product. Identification information is also attached to the sealed container in the form of a barcode, and when the container is sealed, that identification information is read by a barcode reader not shown. Medium replacement information, medium information, culturing chamber information, infection testing results, identification information of the sealed container and so forth are stored in the database as the occasion demands in correlation with the identification information of culture container 101.

In this manner, according to cell culturing device 100 as claimed in the present embodiment, a large number of specimens in the form of cells are cultured simultaneously, and cultured bone as the finished product from each of the cells is produced automatically. At this time, although the cultured bone that is produced is output by sealing in a predetermined sealed container, by reading the barcode attached to said sealed container with a predetermined barcode reader, all identification information of culture containers 101 and culturing chambers 102, medium replacement information, medium information, infection testing results and so forth used in the culturing process can be extracted from the database in the form of information correlated with the identification information of that sealed container.

As a result, since the patient from whom the cells were extracted can be easily collated with the culture bone that has been produced from those cells, together with being able to prevent mix-ups between patients and cells, there is also the advantage of being able to leave a log of all work performed on the cells throughout the culturing process. Thus, in the case there is found to be a problem with infection later on, in addition to being able to trace the cause of that problem, the cause can be removed to ensure the viability of subsequent cultured bone.

Furthermore, cell count detection units that detect the number of cells within a culture container 101 when said culture container 101 is placed on work stage 114 or 115, for example, may be provided on work stages 114 and 115, and the number of cells may be detected whenever the medium is replaced while also storing the detected cell count in memory in correlation with identification information of culture container 101. By doing this, a log can be left of the degree of cell growth during the culturing process, and this can be used as an indicator for determining the degree of cell activity.

In addition, an infection testing unit (not shown) that performs infection testing on cells within culture container 101 may be provided, and those test results may be stored in memory in correlation with identification information of culture container 101. By doing this, a log can be left of the time when an infection occurred during the culturing process.

In addition, the identification information of a culture container containing a specimen that was cultured at the same time as another specimen may be stored in memory in correlation with the identification information of that other specimen in cell culturing section 103 of cell culturing device 100. By doing this, in the case an infection has occurred in one specimen, the effects on other specimens or the possibility of being infected by other specimens can be identified later.

Moreover, although identification information is presented in the form of a barcode in the aforementioned embodiment, a radio wave signal transmission unit capable of emitting identification information in the form of specific radio wave signals, an optical signal generation unit capable of emitting identification information in the form of optical signals, an acoustic signal generation unit capable of emitting identification information in the form of acoustic signals, or an electromagnetic wave signal generation unit capable of emitting identification information in the form of electromagnetic wave signals may also be employed instead of the aforementioned barcode.

INDUSTRIAL APPLICABILITY

As has been explained above, according to the cell culturing system of the present invention, the identification information of all containers used in a series of culturing steps from the receiving of cells containing stem cells collected from patients to the carrying out of cells cultured from those cells can be stored in memory in mutual correlation.

As a result, by following a correlation based on the identification information of an outgoing transport container in which the finished product in the form of the cultured cells are contained, it can be determined as to from which cells contained in which container the cultured cells were cultured.

As a result, since cultured cells can be managed for each patient, mix-ups between patients, such as the cultured cells collected from one patient being transplanted to another patient, can be easily eliminated.

In addition, according to the cultured cell collating device of the present invention, since collation of a patient and cultured bone can be carried out easily simply by inputting two ID numbers consisting of an ID number attached to an incoming transport container containing a patient's bone marrow and an ID number attached to an outgoing transport container in which cultured bone has been contained, together with significantly reducing the time and bother associated with collation, extremely reliable collation results can be obtained. As a result, patients can be prevented from being mixed up.

Moreover, according to the cell culturing device of the present invention, together with being able to automatically produce cultured bone simultaneously from a large number of specimens in the form of cells, since identification information attached to culture containers and so forth that are interchanged during the culturing process is stored in memory in mutual correlation, patients and cultured bone can be collated easily thereby preventing mix-ups between patients. In addition, since information on procedures performed on the cells during the culturing process is stored in memory in correlation with the identification information of the culture containers, a log can be kept in the culturing process thereby making it possible easily trace and investigate any problems that occur later on.

What is claimed is:

1. A cell culturing device that cultures cells by transferring the cells to culture containers to which are attached unique identification information according to the cell culturing process; comprising,
   an input unit that inputs identification information attached to culture containers before and after transfer whenever cells are transferred to a different culture container,
   a unit to transfer cells between containers,
   a memory unit that stores identification information input from the input unit in mutual correlation and a cell count detection unit that detects the number of cells within a culture container; wherein
   the memory unit stores culture container identification information in mutual correlation with the number of cells.

2. A cell culturing device that cultures cells by transferring the cells to culture containers to which are attached unique identification information according to the cell culturing process: comprising,
   an input unit that inputs identification information attached to culture containers before and after transfer whenever cells are transferred to a different culture container,
   a unit to transfer cells between containers,
   a memory unit that stores identification information input from the input unit in mutual correlation and an infection testing unit that performs infection testing on cells in a culture container; wherein
   the memory unit stores culture container identification information in correlation with the results of infection testing.

* * * * *